United States Patent [19]
Weight

[11] Patent Number: 5,355,471
[45] Date of Patent: Oct. 11, 1994

[54] MULTIPROCESSOR CACHE COHERENCY TESTER THAT EXERCISES THE COHERENCY LOGIC EXHAUSTIVELY AND ALSO DETECTS ERRORS IN A PROCESSOR USING AN AUTOMATIC CPU SORT

[75] Inventor: Russell H. Weight, Hillsboro, Oreg.

[73] Assignee: Pyramid Technology Corporation, San Jose, Calif.

[21] Appl. No.: 929,370

[22] Filed: Aug. 14, 1992

[51] Int. Cl.$^5$ .............................................. G06F 11/00
[52] U.S. Cl. .................................... 395/575; 395/425
[58] Field of Search .................... 371/16.1, 11.3, 11.1, 371/8.1; 395/575

[56] References Cited

U.S. PATENT DOCUMENTS

| | | | |
|---|---|---|---|
| 4,622,631 | 11/1986 | Frank et al. | 395/800 |
| 4,833,601 | 5/1989 | Barlow et al. | 395/425 |
| 4,991,090 | 2/1991 | Emma et al. | 395/575 |
| 5,136,700 | 8/1992 | Thacker | 395/400 |
| 5,155,843 | 10/1992 | Stamm et al. | 395/575 |
| 5,247,648 | 9/1993 | Watkins et al. | 395/425 |
| 5,261,109 | 11/1993 | Cadambi et al. | 395/725 |
| 5,265,232 | 11/1993 | Gannon et al. | 395/425 |
| 5,265,235 | 11/1993 | Sindhu et al. | 395/425 |
| 5,271,020 | 12/1993 | Marisetty | 371/30 |
| 5,276,828 | 1/1994 | Dion | 395/425 |

OTHER PUBLICATIONS

Ahmed et al., "Cache-Aided Rollback Error Recovery (Carer) Alorithms for shared memory Multiprocessor Systems", 1990 IEEE Computer Society Press, pp. 82–88.

Fuchs et al., "Error Recovery in Shared Memory Multiprocessors Using Private Caches," Apr. 1990, IEEE Trans. on Parallel & Distributed Systems vol. 1, No. 2, pp. 231–240.

*Primary Examiner*—Robert W. Beausoliel, Jr.
*Assistant Examiner*—Phillip F. Vales
*Attorney, Agent, or Firm*—Burns, Doane, Swecker & Mathis

[57] ABSTRACT

A cache coherency test exercises cache coherency logic exhaustively such that any cache coherency failures liable to occur will occur. The CPU(s) which caused the failure is automatically identified by performing an automatic CPU sort. In particular, cache coherency is tested by causing each processor in the system to perform a sequence of read and write accesses to main memory and to its own cache memory so as to cause substantially every possible sequence of cache coherency bus operations. Each processor tests consistency of data read by it with data written by it. As long as no processor detects an error, read and write accesses are continued for a predetermined period of time. When any processor detects an error, each CPU is disabled, one at a time, to see if the remaining CPUs can run the test successfully. If they do not, then every combination of two CPUs are disabled, then every combination of three, etc. In this manner, a maximum running set of CPUs is identified. CPU failures are verified by substituting, one at a time, failing CPUs for a passing CPU and again running the test. If the test is unsuccessful, then failure of the CPU is presumed to be conclusive.

5 Claims, 6 Drawing Sheets

FIG._1
*(PRIOR ART)*
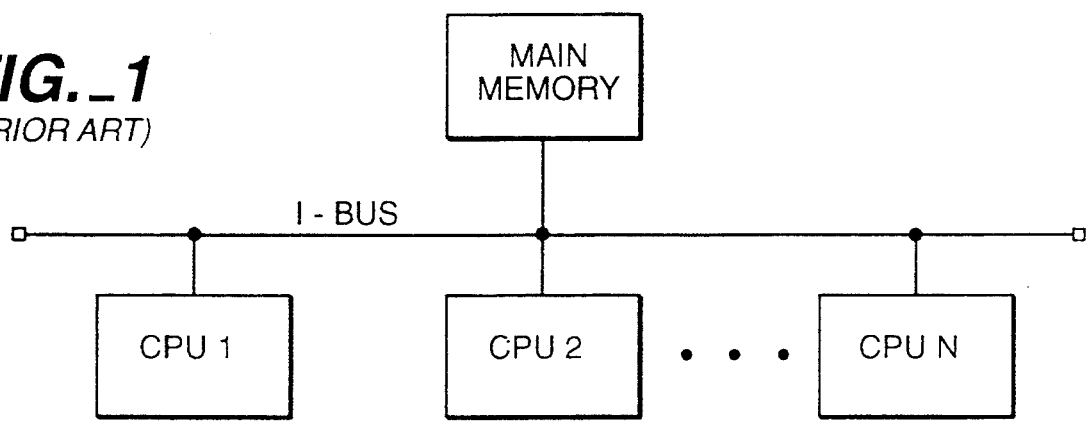
FIG._2
*(PRIOR ART)*
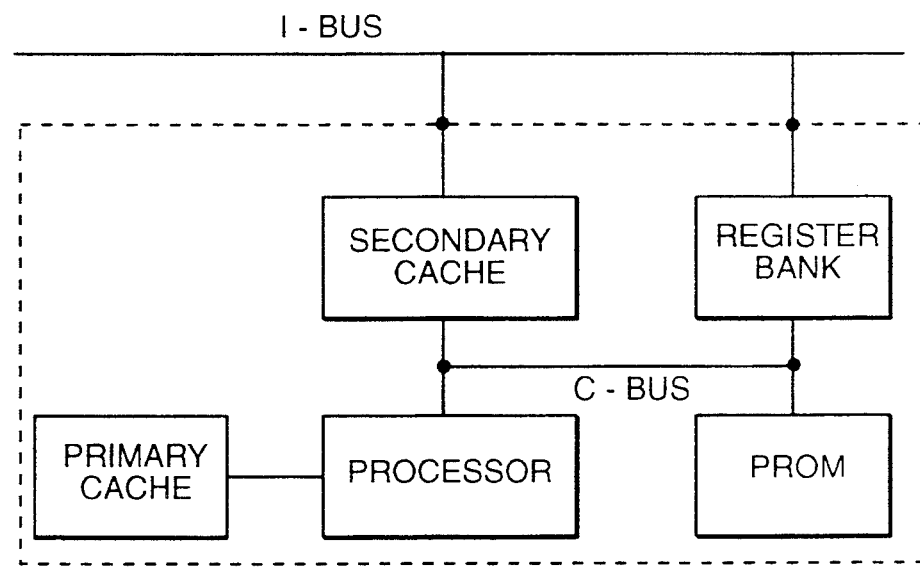
FIG._5A
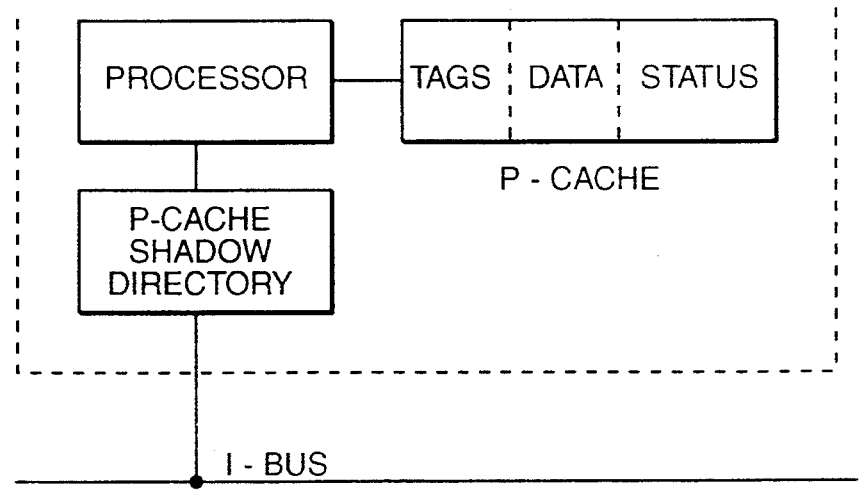

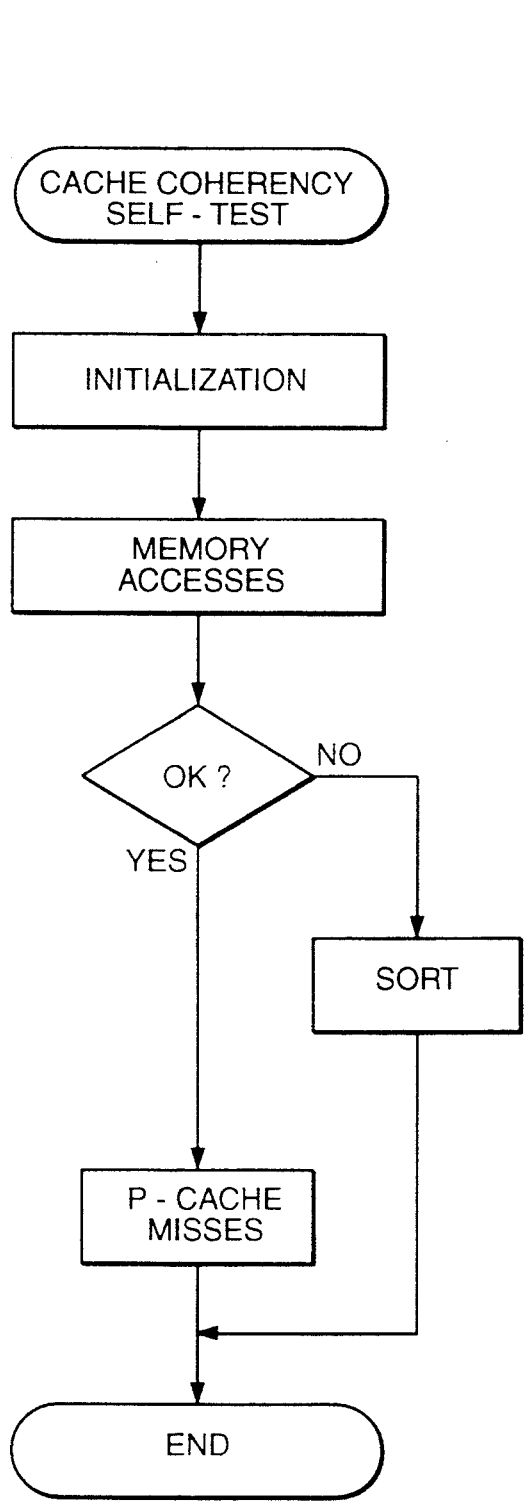
FIG._3
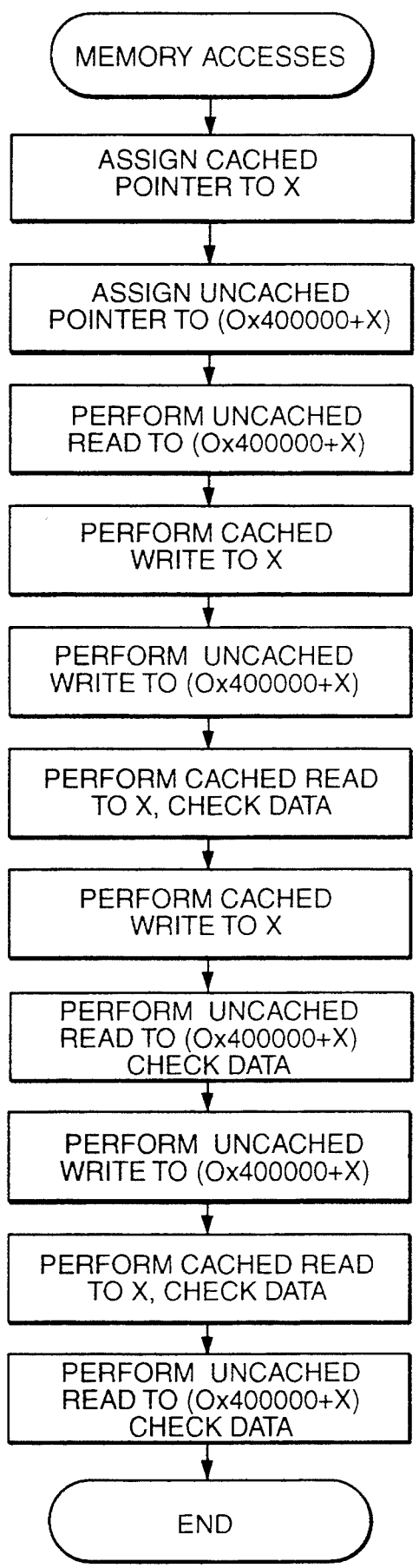
FIG._4

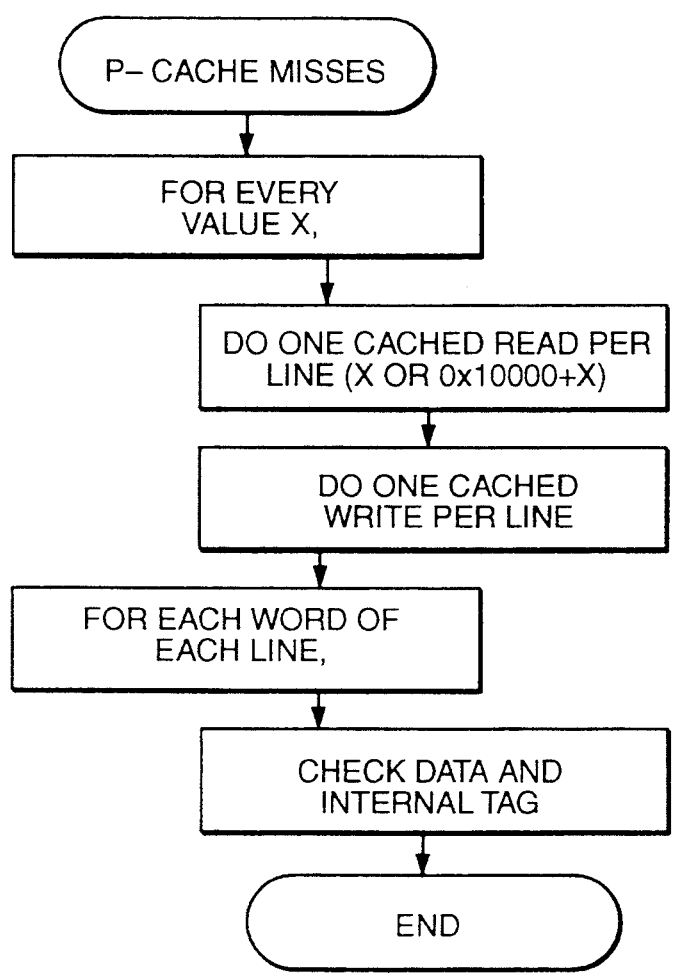
FIG._5B
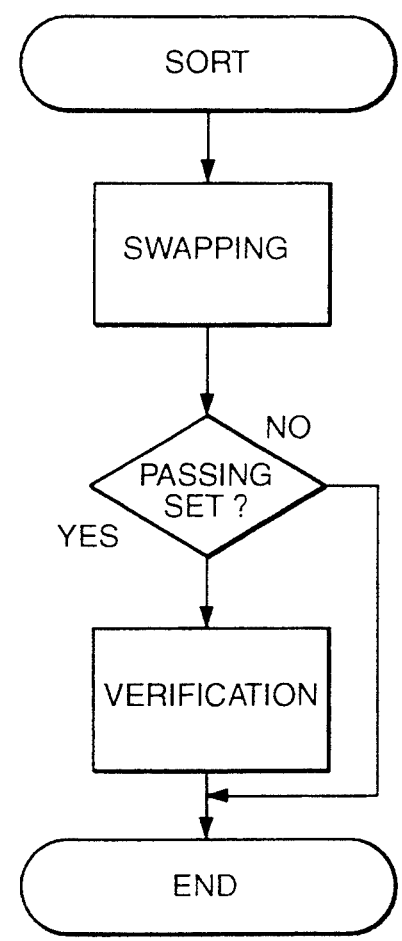
FIG._7

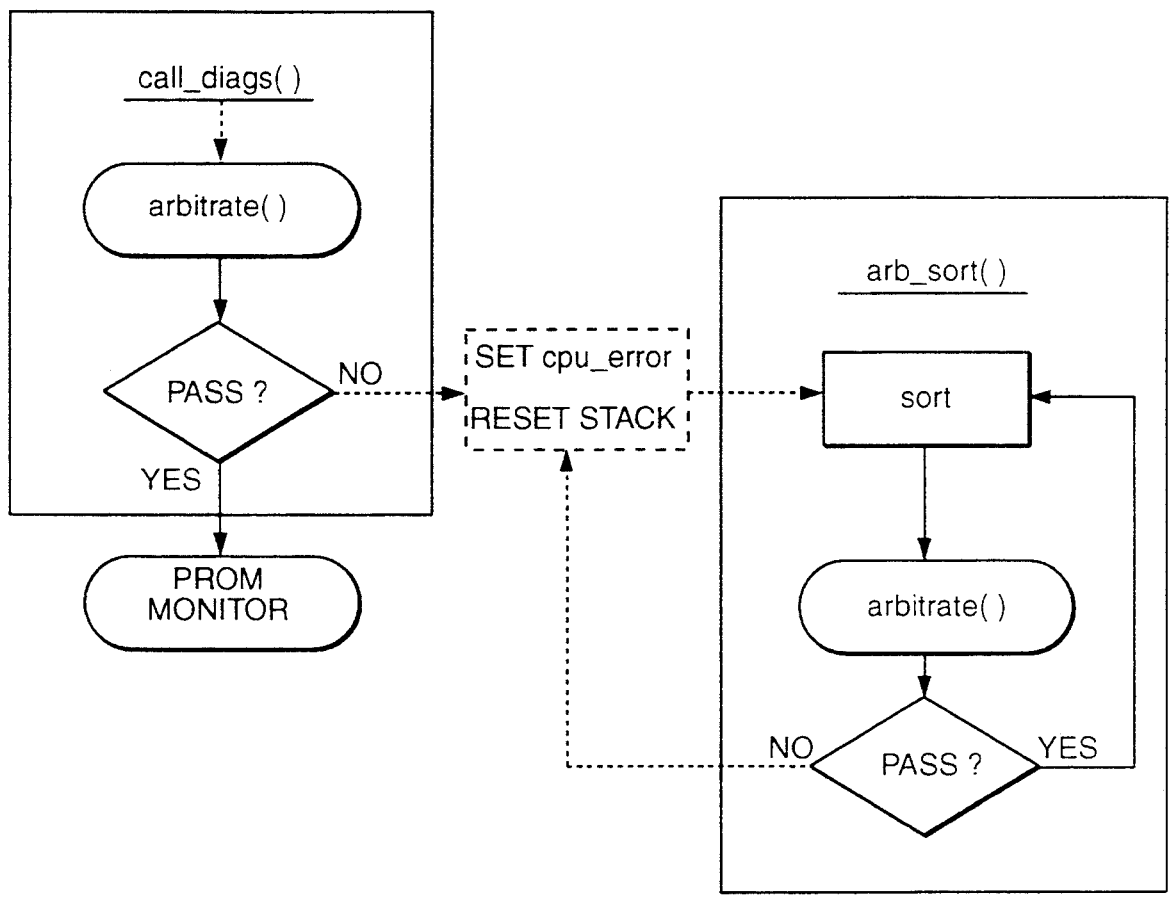
FIG._6

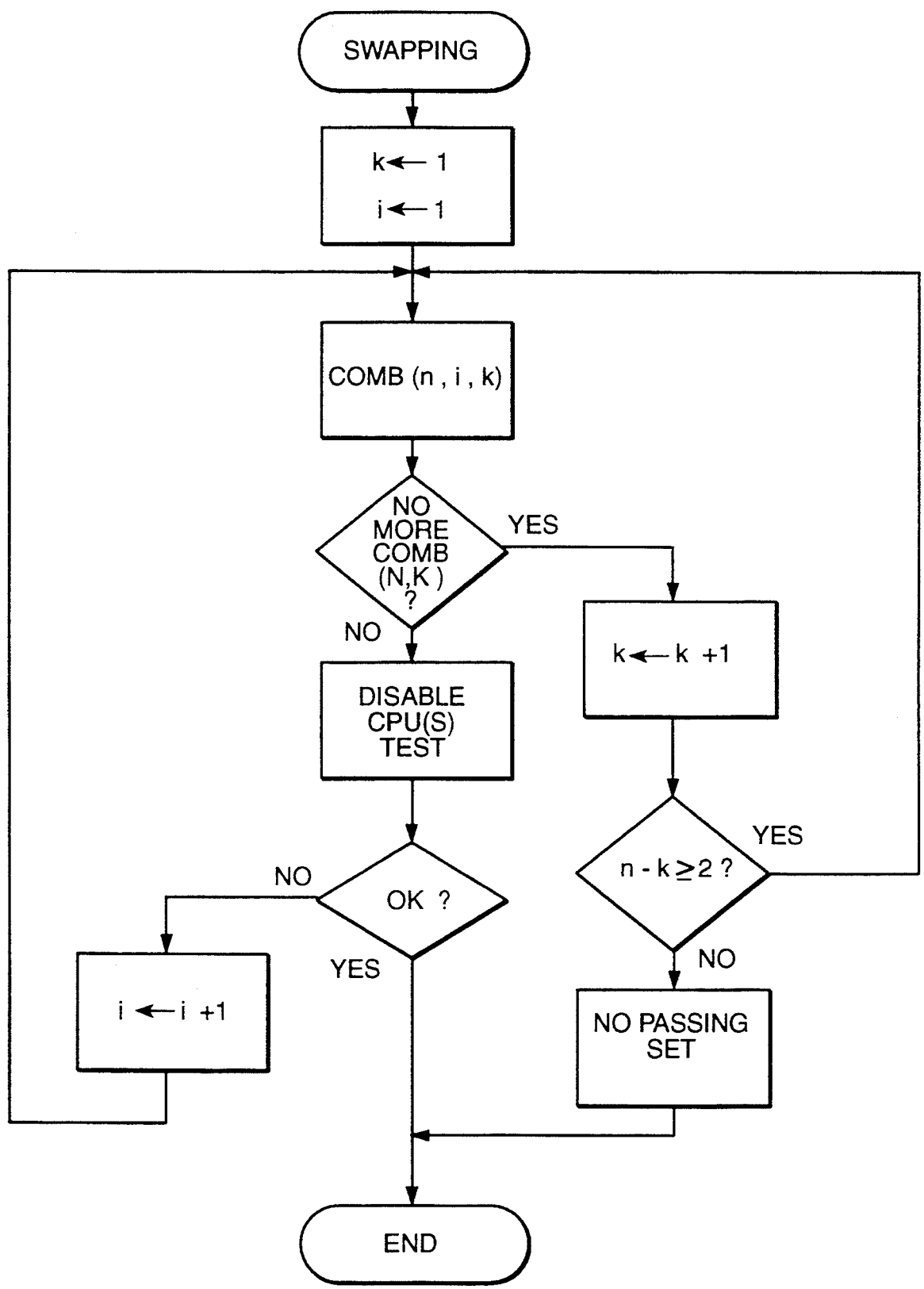
FIG._8

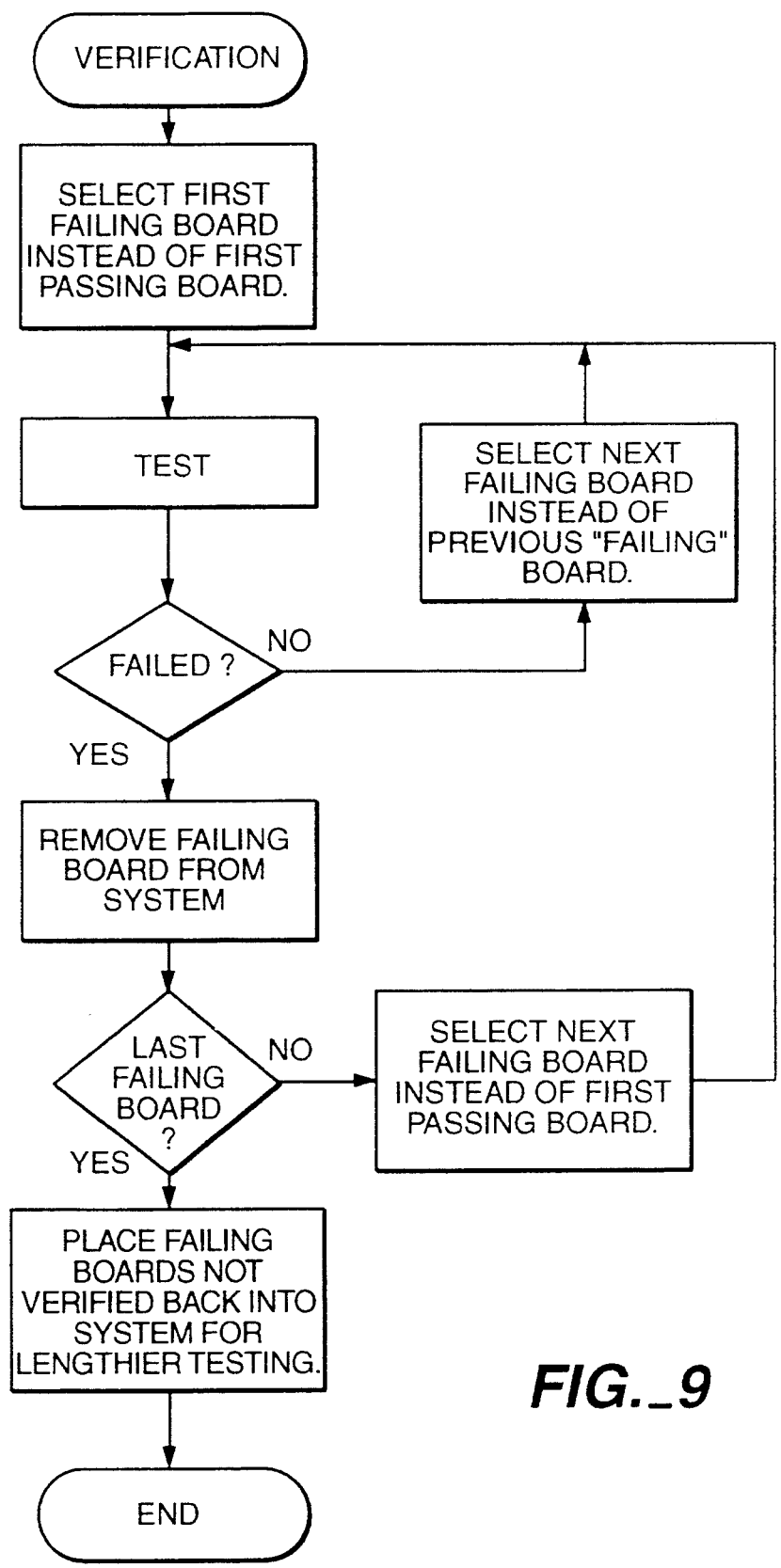
FIG._9

MULTIPROCESSOR CACHE COHERENCY TESTER THAT EXERCISES THE COHERENCY LOGIC EXHAUSTIVELY AND ALSO DETECTS ERRORS IN A PROCESSOR USING AN AUTOMATIC CPU SORT

BACKGROUND OF THE INVENTION

1. Field of the Invention

The present invention relates to diagnostic testing in multiprocessor computer systems and more particularly to an off-line multiprocessor cache coherency test for identifying CPU failures resulting in cache coherency errors.

2. State of the Art

The complex problem of maintaining cache coherency in a peer-to-peer multiprocessor computer system has been thoroughly studied, and various mechanisms for maintaining cache coherency have been proposed. Briefly stated, cache coherency requires that a read operation by any CPU in the system to a particular memory location return the latest value written to that memory location by any CPU in the system. An example of a known multiprocessor system is shown in FIGS. 1 and 2. Referring to FIG. 1, multiple CPUs, N in number, are connected to a common bus, (the I-BUS) and share a common main memory, also connected to the I-BUS. Each of the CPUs is therefore able to access main memory via the I-BUS. In addition, the CPUs are able to communicate among themselves across the I-BUS.

As seen in FIG. 2, each CPU is provided with a two-level cache including a secondary cache and a primary cache. The secondary cache is connected to the I-BUS so as to receive groups of data words (cache lines) from main memory or from other CPUs. Each CPU also includes a bank of registers and a PROM that serves as a control store. The register bank of each CPU is accessible by other CPUs across the I-BUS. The processor (in an exemplary embodiment, a MIPS R3000) is connected to the secondary cache, the register bank and PROM by an internal bus (the C-BUS). The processor is connected to the primary cache by a separate bus. The primary cache has an instruction cache (I-CACHE) portion and a data cache (D-CACHE) portion, not shown.

In operation, when the multiprocessor system is first brought up, none of the caches contains valid data. As data is retrieved from main memory, it is cached in the secondary cache. Data used with some level of frequency will remain in the secondary cache. Data used even more frequently is stored in the primary cache. Multiple copies of the same piece of data may reside in different caches. To ensure that only the most recently updated copy is used (cache coherency), status bits stored in cache indicate the status of each cache line. For example, a cache line may be indicated to be invalid, representing that data contained in the cache line has been updated by another CPU since the time the line was cached. The cache line may be indicated as having been modified, representing that the most recent update to the data was by the cache's own processor, but that the data has not yet been written back to main memory. The cache line may be indicated as being shared, representing that the data is valid but that at least one other CPU currently has a copy of the data. Finally, the cache line may be represented as being exclusive, in which case the data is unmodified and no other CPU currently has a copy of the data. Each of the CPUs continually monitors the I-BUS (called "snooping") to determine which memory locations have been accessed by the other CPUs. Cache states of the cache lines in each cache are changed as appropriate in accordance with known cache coherency mechanisms.

Cache coherency failure occurs when an access by CPU to a particular memory location returns a data value that is not the most recently updated data value. A major problem with cache-coherency failures is that the CPU which detects a failure is frequently not the CPU which caused the failure. This problem makes it very difficult to identify the failing CPU board. During manufacture of a multiprocessor computer system, circuit CPUs causing cache coherency failures must be identified and replaced in order to assure a properly working system. Furthermore, a need exists for a method of flushing out cache coherency design errors from an off-line environment during engineering development. Tests which run on-line are not suitable for engineering development. In the past, isolation of cache coherency failures has often required manually adding-/removing CPU boards until the system is able to run successfully. This method is tedious, time-consuming and error-prone.

What is needed, then, is a method of rigorously testing cache coherency in a multiprocessor system and of automatically identifying the CPU(s) which cause cache coherency failure. A desirable approach to testing cache coherency is to create maximum cache coherency traffic on the shared bus in order to cause failures to surface. For rigorous testing, every possible sequence of cache-coherency bus operations should occur.

SUMMARY OF THE INVENTION

The present invention, generally speaking, provides for a multiprocessor system a cache coherency test that exercises cache coherency logic exhaustively such that any cache coherency failures liable to occur will occur. The CPU(s) which caused the failure is automatically identified by performing an automatic CPU sort. In particular, cache coherency is tested by causing each processor in the system to perform a sequence of read and write accesses to main memory and to its own cache memory so as to cause substantially every possible sequence of cache coherency bus operations. Each processor tests consistency of data read by it with data written by it. As long as no processor detects an error, read and write accesses are continued for a predetermined period of time. When any processor detects an error, the error is signaled on the bus; thereafter, at least one processor is disabled, and the read and write accesses are continued until a passing group of processors remains. In essence, each CPU is disabled, one at a time, to see if the remaining CPUs can run the test successfully. If they do not, then every combination of two CPUs are disabled, then every combination of three, etc. In this manner, a maximum running set of CPUs is identified.

BRIEF DESCRIPTION OF THE DRAWINGS

The present invention can be further understood with reference to the following description in conjunction with the appended drawings. In the drawings:

FIG. 1 is a simplified block diagram of a multiprocessor system in which multiple processors share a common main memory;

FIG. 2 is a simplified block diagram of one of the CPUs of FIG. 1;

FIG. 3 is a flowchart of a cache coherency self-test;

FIG. 4 is a flowchart of a memory accesses portion of the cache coherency self-test of FIG. 3;

FIG. 5A is a simplified block diagram showing the arrangement of the primary cache;

FIG. 5B is a flowchart of a P-cache misses portion of the cache coherency self-test of FIG. 3;

FIG. 6 is a diagram illustrating the way in which a sort routine interfaces with the main test routine;

FIG. 7 is a flowchart of the sort portion of the cache coherency self-test of FIG. 3;

FIG. 8 is flowchart of the swapping portion of the sort routine off FIG. 7; and

FIG. 9 is a flowchart of the verification portion of the sort routine of FIG. 7.

DETAILED DESCRIPTION OF THE PREFERRED EMBODIMENTS

In the following description, the term "cached" means that a data or instruction access goes to the primary cache as well as the secondary cache. The term "uncached" means that a data or instruction access bypasses the primary cache. This term does not have any reference to the secondary cache.

The cache coherency test is the last of a suite of tests performed upon power-up. The flowchart of FIG. 3 presents an overview of the cache coherency test, different portions of which are described in detail hereinafter.

Referring to FIG. 3, the main body of the test is preceded by an initialization routine. During initialization, test code is loaded from PROM into the primary instruction cache, and cache data and cache states are initialized. Board control map and system board control map registers are initialized. Board control map locations are associated with each CPU board and contain data, status and control information. In general, the operating system accesses the board control map locations to handle certain conditions during kernel execution, or as a result of operator intervention. The system board control map is a portion of address space through which each CPU may access the board control maps of every other CPU. Synchronization of the CPUs is performed by designating a master CPU, which then uses directed interrupts to synchronize operation of the remaining CPUs.

After initialization, each of the CPUs begins a series of memory accesses designed to maximize cache coherency operations on the I-BUS and to cause substantially every possible combination of cache states to occur. A number of CPUs equal to the number of words in a memory line (for example, eight) are grouped together, and each CPU is assigned a different word position in a memory line. Each CPU performs multiple read and write accesses to its assigned word in each of a sequence of memory lines distributed in memory. The cache coherency self-test is called repeatedly from a timed loop of self-tests. (Each time through the loop, each CPU waits a random period of time, preventing the CPUs from getting into lock-step.) During alternate passes through the loop, a different one of two different data words is written during write accesses. During certain read accesses, the data is checked to insure that stale data written during a previous pass has not been erroneously returned.

If stale data is detected, a sort routine is executed to identify the failing CPU(s). Otherwise, a second portion of the test is executed in which P-cache misses are caused in order to test the operation of line-fills from secondary cache.

Referring now to FIG. 4, to perform the memory accesses previously described, a "cached" pointer in the processor is assigned to a value X where X represents one of the elements of a memory address array set forth in Table 1 below. An "uncached" pointer is set to X plus the secondary cache size, in this instance 4MB or, in hexadecimal notation, 0x4000000.

TABLE 1 static unsigned long mem_addr[] = {
0×00000000, 0×00000080, 0×00000100, 0×00000200, 0×00000400,
0×00000800, 0×00001000, 0×00002000, 0×00004000, 0×00008000,
0×00010000, 0×00020000, 0×00040000, 0×00080000, 0×00100000,
0×00200000, 0×00300000, TABLE_END
}; (TABLE_END is a constant signalling end of table.)

After the pointers have been set, the processor then begins a sequence of cached and uncached read and write operations designed to ensure that every cache state that may be guaranteed to occur does occur. First, the processor performs an uncached read to 0x400000+X, following which it performs a cached write to X. Then the processor performs an uncached write to 0x400000+X, followed by a cached read to X. The data received is then checked. The data words written to memory have a format defined in Table 2.

TABLE 2

| Bits | Data Word Format |
|------|------------------|
|      | Definition |
| 31:28 | 0×A if uncached access, 0×8 if cached access |
| 27:24 | 6 or 9 (alternating on each loop) |
| 23:2 | address of word access |
| 1:0 | zero |

Note that bits 27:24 are toggled between 6 (0110) and 9 (1001). By examining these bits, the processor is able to determine if the data returned during a memory read operation is fresh data or stale data. If stale data is discovered, the CPU asserts an error bit on the I-BUS monitored by all CPUs in the system. The sort routine is then entered in order to identify the faulty CPU.

If fresh data is returned by the cached read, then the processor proceeds by performing a cached write to X, followed by an uncached read to 0x400000+X. The processor then performs an uncached write to 0x400000+X, followed by a cached read to X, and checks the data. Finally, the processor performs an uncached read to 0x400000+X and checks the data. The memory accesses subroutine then concludes.

Although the foregoing subroutine cannot guarantee the occurrence of every cache state, the traffic volume of cache coherency operations on the I-BUS from all of the CPUs creates a high probability that every cache state will in fact occur. Cache coherency among all the CPUs is therefore rigorously tested.

If the number of CPUs in a group is less than the number of words in a memory line, a CPU may be assigned multiple words. Table 3 shows how the words of a memory line are assigned to CPUs.

pre-loaded into the lines of the secondary cache identified in Table 6 during initialization.

TABLE 6

```
static unsigned long cache_addr[] = {
    0x00001120, 0x00001140, 0x00001080, 0x00001100, 0x00001200,
    0x00001400, 0x00001800, 0x00002800, 0x00004800, 0x00008800,
    TABLE_END
};
```

TABLE 3

| # of CPUs | Words Within a Memory Line | | | | | | | |
|---|---|---|---|---|---|---|---|---|
|   | 0 | 1 | 2 | 3 | 4 | 5 | 6 | 7 |
| 2 | 1 | 1 | 1 | 1 | 2 | 2 | 2 | 2 |
| 3 | 1 | 1 | 1 | 2 | 2 | 2 | 3 | 3 |
| 4 | 1 | 1 | 2 | 2 | 3 | 3 | 4 | 4 |
| 5 | 1 | 1 | 2 | 2 | 3 | 3 | 4 | 5 |
| 6 | 1 | 1 | 2 | 2 | 3 | 4 | 5 | 6 |
| 7 | 1 | 1 | 2 | 3 | 4 | 5 | 6 | 7 |
| 8 | 1 | 2 | 3 | 4 | 5 | 6 | 7 | 8 |

Furthermore, if the total number of CPUs in the system is greater than the number of words in a memory line, the number of memory lines used may be increased. Table 4 shows how many memory lines and which memory addresses are used for up to 8 CPUs, up to 16 CPUs, and up to 24 CPUs. Table 5 shows how the CPUs are assigned to memory lines.

TABLE 4

| Max CPUs | Mem Lines | Addresses used (where X is an element of array mem_addr[]) |
|---|---|---|
| 8 | 1 | X to (X+0×1c) and (0×400000+X) to (0×400000+X+0×1c) |
| 16 | 2 | X to (X+0×3c) and (0×400000+X) to (0×400000+X+0×3c) |
| 24 | 3 | X to (X+0×5c) and (0×400000+X) to (0×400000+X+0×5c) |

TABLE 5

| Max CPUs | Mem Lines | Number of CPUs for Address Ranges: | | |
|---|---|---|---|---|
|   |   | X to (X+0×1c) | (X+0×20)to (X+0×3c) | (X+0×40)to (X+0×5c) |
| 5 | 1 | 5 | — | — |
| 6 | 1 | 6 | — | — |
| 8 | 1 | 8 | — | — |
| 9 | 2 | 5 | 4 | — |
| 10 | 2 | 5 | 5 | — |
| 12 | 2 | 6 | 6 | — |
| 13 | 2 | 7 | 6 | — |
| 16 | 2 | 8 | 8 | — |
| 17 | 3 | 6 | 6 | 5 |
| 19 | 3 | 7 | 6 | 6 |
| 20 | 3 | 7 | 7 | 6 |
| 21 | 3 | 7 | 7 | 7 |
| 22 | 3 | 8 | 7 | 7 |
| 24 | 3 | 8 | 8 | 8 |

If the memory accesses portion of the test is successful, i.e., no error is detected, correct operation of the primary/secondary cache interface within each CPU is then tested. Unlike the previous test, the words of the memory lines are not divided up among CPUs, and data is not written to main memory and will therefore not be seen on the I-BUS. The memory addresses accessed are different than in the previous test and are shown in Table 6. The data is also different. The data for this portion of the test is the logical OR of the assigned CPU ID, the memory address and 0x80000000. This value is In order to cause frequent misses in the primary data cache, this sub-test is executed twice in succession on each loop of the test code, first at X where X is a value read from the array of Table 6, and then at X plus the size of the primary cache, in this instance 0x10000. Frequent cache misses cause line-fills from the secondary cache while snoops and other activity are also using the C-BUS. Verification may therefore be made that the line-fills take place correctly and the primary cache tag array is correctly loaded.

Referring briefly to FIG. 5A, a record of which memory locations are stored in the primary cache together with the status of those memory locations is maintained both internally in the primary cache itself and, to facilitate multiprocessing, externally in a P-cache shadow directory. The record of the contents of the primary cache is maintained on a memory-line basis in the shadow directory and on a memory-word basis in the primary cache. Each memory word in the primary cache therefore includes, in addition to data, a tag portion indicating which word of a possible set of words is stored in the memory location, and a status portion indicating the status of the data. The P-cache misses subroutine tests whether the external tags stored in the P-cache shadow directory are set correctly during operation.

Referring now to FIG. 5B, the illustrated sequence of functions is repeated for each address X in Table 3. The cache lines used in this part of the test are preset to the Modified state on all CPUs simultaneously during initialization. For every value X, the processor performs a cached read per line to either X (first execution) or 0x10000+X (second execution) to cause line-fills from the secondary to primary cache. Following the read, the processor performs one cached write per line to verify that the external tags in the P-cache shadow directory are set correctly. If the external tag is incorrect, then hardware will invalidate the internal primary tags and data. In the next step, whether the external tags were set correctly is checked by checking the data and internal tag for each word of each line in the primary data cache.

In the case of the first memory accesses subtest, as previously explained, the CPU detecting the error is usually not the same CPU that caused the error. Also in the case of the second P-cache misses subtest, the CPU detecting the error may conceivably not be the same CPU that caused the error. In order to identify the CPU that caused the error, a sort routine is performed. The relationship between the sort routine and the overall diagnostic routine is illustrated in FIG. 6. The arbitrate( ) test, which includes the cache coherency test, is one of a suite of self-tests called by a call_diags( ) routine. During the arbitration test, if the system passes the test, then control returns to a Prom Monitor. If a failure is detected, a signal CPU_error is set on the I-BUS, and a system stack is reset. A sort routine arb_sort( ) is then called. During the sort routine, the arbitration test is re-called. When all of the failing CPUs have been removed, the remaining CPUs are placed into infinite arbitration. Alternatively, control may be returned to the Prom Monitor.

During the sort routine, if the arbitration test is not successful, then the system stack is reset and the sort routine is re-called. Once the sort routine has been called, all of the calls to the arbitration test are made from the sort routine. Therefore, on passing conditions after the initial failure, the sort routine is re-entered by a normal return from the arbitration test. On a failing condition thereafter, the sort routine is re-entered by a call to the sort routine from an error or exception handler. This information may therefore be used by the sort routine to determine whether the running set of CPUs has passed or failed.

Throughout the course of the sorting, there is always a master CPU, but the role of master is passed around frequently as CPUs are swapped in and out of the running set.

Referring to FIG. 7, the sort routine includes both a CPU-swapping function and a verification function. Even though a passing set of CPUs may have been identified, without further verification, it cannot be positively ascertained that all of the passing CPUs are good. Since CPUs can fail at different system levels, a verification process is needed. For example, in a four CPU system containing a CPU that passes in a two or three CPU configuration, but fails in a four CPU configuration, CPU-swapping alone will not be able to sort out the bad CPU. In the swapping process, swapping any one of the CPUs out will leave a three CPU system which will pass, even if a good CPU board is being swapped out and the bad CPU remains. For this reason, a verification process is necessary to avoid reporting a good CPU as bad, and leaving a bad CPU in the system.

Accordingly, the sort routine as illustrated in FIG. 7 begins with a CPU-swapping process that proceeds until a passing set of CPUs has been identified. If no passing set of CPUs can be identified, then the routine concludes and an error message is displayed. If a passing set of CPUs is identified, however, then that passing set is further verified during a verification process.

During a swapping routine, at least one processor is disabled, and testing continues until a passing group of processors remains. Essentially, each CPU is disabled, one at a time, to see if the remaining CPUs can run the test successfully. If they do not, then every combination of two CPUs are disabled, then every combination of three, etc. In this manner a maximum running set of CPUs identified. An example of the swapping process for a four CPU system is shown in Table 7 below.

TABLE 7

| Swap Iterations | CPU Swapping CPUs Swapped Out | | | |
|---|---|---|---|---|
| | 3 | 2 | 1 | 0 |
| 1 | X | | | |
| 2 | | X | | |
| 3 | | | X | |
| 4 | | | | X |
| 5 | X | X | | |
| 6 | X | | X | |
| 7 | X | | | X |
| 8 | | X | X | |
| 9 | | X | | X |
| 10 | | | X | X |

Referring to FIG. 8, in an initial step, counting variables k and i are initialized to one. A subroutine COMB(n,i,k) is then invoked. This subroutine returns an n-bit binary word, where n is the number of CPUs in the system. The binary word represents the i-th combination of n things taken k at a time. The COMB subroutine may be a recursive subroutine or may be implemented by table look-up. Unless the last combination of the n CPUs taken k at a time has already been returned, the subroutine returns a binary word according to which one or more of the CPUs are disabled. Cache coherency of the reduced set of CPUs is then tested as described previously. If the test is successful, then the swapping routine concludes. Otherwise, the counting variable i is incremented and the subroutine COMB is again invoked to get the next combination of n CPUs taken k at a time. When the last combination of n CPUs taken k at a time has already been returned, then k is incremented and a check is performed to insure that the updated value of k causes a minimum set of at least two CPUs to remain in the system. If not, then no passing set exists and the swapping routine concludes with an appropriate error message. Otherwise, the routine continues by re-invoking the COMB subroutine.

Once a passing set of CPUs has been identified, verification is performed as previously described. Referring to FIG. 9, at the outset, a first failing CPU is substituted into the set of passing CPUs instead of the first passing CPU. The test sequence is then performed. Presumably, the test will fail, in which case failure of the CPU is conclusive and the CPU is removed from the system. A next failing CPU is then substituted into the passing set of CPUs instead of the first passing CPU for so long as there is next failing CPU. Verification with respect to the next failing CPU proceeds as previously described. Once verification has been performed with respect to all of the failing CPUs, the routine concludes.

If the test succeeds with one of the supposedly failing CPUs, then the next failing CPU is substituted for the previous "failing" CPU, and the verification process continues. As a final step, before the routine concludes, supposedly failing CPUs whose failure could not be verified are placed back into the system to undergo lengthier testing. For example, whereas the default testing period might be 10 seconds, for example, following verification, if failure of one or more CPUs could not be verified, the testing period may be set to 40 seconds, for example, in an effort to cause the failure to manifest itself. This process continues, possibly during several cycles of verification and increasingly lengthier testing, until, if possible, all failures have been verified.

By means of the described automatic CPU sort, CPUs causing cache coherency failures may be reliably identified and removed from the system without manually swapping CPUs in and out repeatedly. Since the nature of possible cache coherency failures cover a wide spectrum, it is not possible to identify every failure, nor is it possible to always identify the failing CPUs with 100% accuracy. However, an estimated 85% of all cache coherency errors may be accurately identified using the described method.

The foregoing has described the principles, preferred embodiments and modes of operation of the present invention. However, the present invention should not be construed as being limited to the particular embodiments discussed. Accordingly, the above-described embodiments should be regarded only as illustrative, and it should be appreciated that workers skilled in the art may make variations in those embodiments without departing from the invention as defined by the following claims.

What is claimed is:

1. In a computer system having multiple processors sharing a common main memory accessed through a common bus, each processor having its own cache memory, a method of testing cache coherency, comprising the steps of:

(a) causing each processor to perform a sequence of read and write accesses to main memory and to its own cache memory so as to cause substantially every possible sequence of cache coherency bus operations, each processor testing consistency of data read by it with data written by it;

(b) as long as no processor detects an error, continuing said read and write accesses for a predetermined period of time;

(c) when any processor detects an error, signalling said error on said bus and thereafter disabling at least one processor; and (d) repeating steps (a), (b) and (c) until either a passing group of processors remains and no processor has detected an error for a predetermined period of time or no passing group of processors remains.

2. The method of claim 1, comprising the further step of (e) disabling a processor among said passing group of processors and re-enabling in its stead a processor previously disabled and suspected of having caused a previous error;

(f) repeating step (a)-(c);

(g) if an error is detected, disconnecting from said computer system said processor suspected of having caused a previous error; and (h) if no error is detected, repeating steps (a)-(c) with said passing group of processors and said processor suspected of having caused a previous error but with said predetermined period of time increased.

3. The method of claim 1 in step (c) of which processors are disabled first one at a time, then two at a time, then three at a time, and so forth, until either a passing group of processors remains or no passing group of processors remains as determined in step (d).

4. The method of claim 1 in step (a) of which a plurality of said processors perform read and write accesses to different assigned words of a single memory line in main memory.

5. The method of claim 1 wherein said processors each has a cache memory composed of a primary cache, including an internal directory and an external shadow directory, and a secondary cache, said method comprising the further steps of (i) causing each processor to perform a sequence of read and write accesses to its own cache only, so as to cause frequent misses in the primary data cache and line-fills from the secondary cache, each processor testing whether tags in the shadow directory are set correctly; and (j) as long as no processor detects an error, continuing said read and write accesses for a predetermined period of time.

* * * * *